United States Patent [19]

Azema

[11] Patent Number: 5,705,290
[45] Date of Patent: Jan. 6, 1998

[54] SECONDARY CELL SAFETY DEVICE INCLUDING PRESSURE RELEASE MECHANISM AND CURRENT CUTOFF MECHANISM

[75] Inventor: Tadamitsu Azema, Miyagi-ken, Japan

[73] Assignee: Alps Electric Co., Ltd., Tokyo, Japan

[21] Appl. No.: 683,400

[22] Filed: Jul. 18, 1996

[30] Foreign Application Priority Data

Nov. 8, 1995 [JP] Japan ............................. 7-206033

[51] Int. Cl.[6] .................................................. H01M 2/12
[52] U.S. Cl. .................................................. 429/53; 429/57
[58] Field of Search .................................. 429/53, 56, 57

[56] References Cited

U.S. PATENT DOCUMENTS

| | | | |
|---|---|---|---|
| 4,601,959 | 7/1986 | Romero | 429/56 |
| 4,931,368 | 6/1990 | Ayeis et al. | 429/53 |
| 4,943,497 | 7/1990 | Oishi et al. | 429/53 |
| 4,971,867 | 11/1990 | Watanabe et al. | 429/61 |
| 5,427,875 | 6/1995 | Yamamoto et al. | 429/233 |
| 5,455,128 | 10/1995 | Tanaka | 429/218 |

*Primary Examiner*—M. Nuzzolillo
*Attorney, Agent, or Firm*—Guy W. Shoup; Patrick T. Bever

[57] ABSTRACT

Disclosed is a safety device of a secondary cell, which comprises a lid having an opening section and directly or indirectly fixed for closing a cell case; a pressure receiving means covering the opening section and having flexibility to displace with an internal pressure of the cell; an element having a conductive path connected at one end to an internal electrode of the cell and at the other end to an external electrode, for breaking the conductive path with displacement of the pressure receiving means resulting from a change in the internal pressure of the cell; and locking pawls which fasten the pressure receiving means to the lid by staking to close the cell interior, to thereby keep the cell interior closed when the internal pressure is at a specific value or less and to release a gas from inside through a gap produced between the pressure receiving means and the lid by unfastening staked sections when the internal pressure has exceeded the specific value.

6 Claims, 5 Drawing Sheets

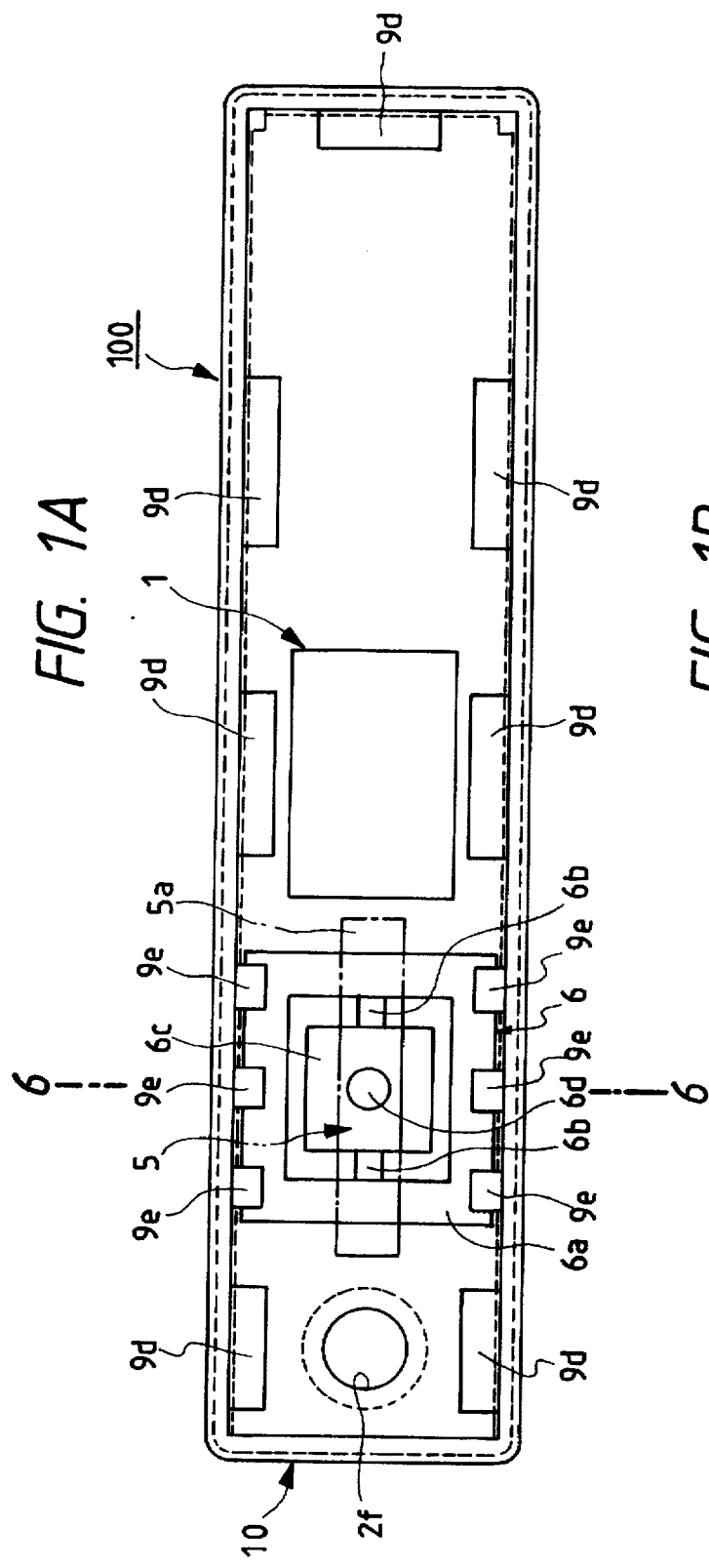
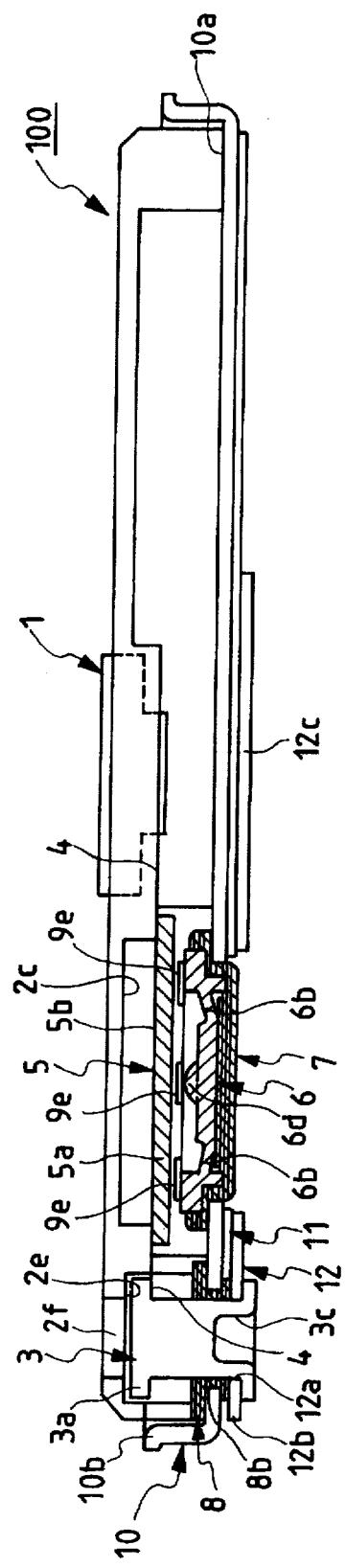
FIG. 1A
FIG. 1B

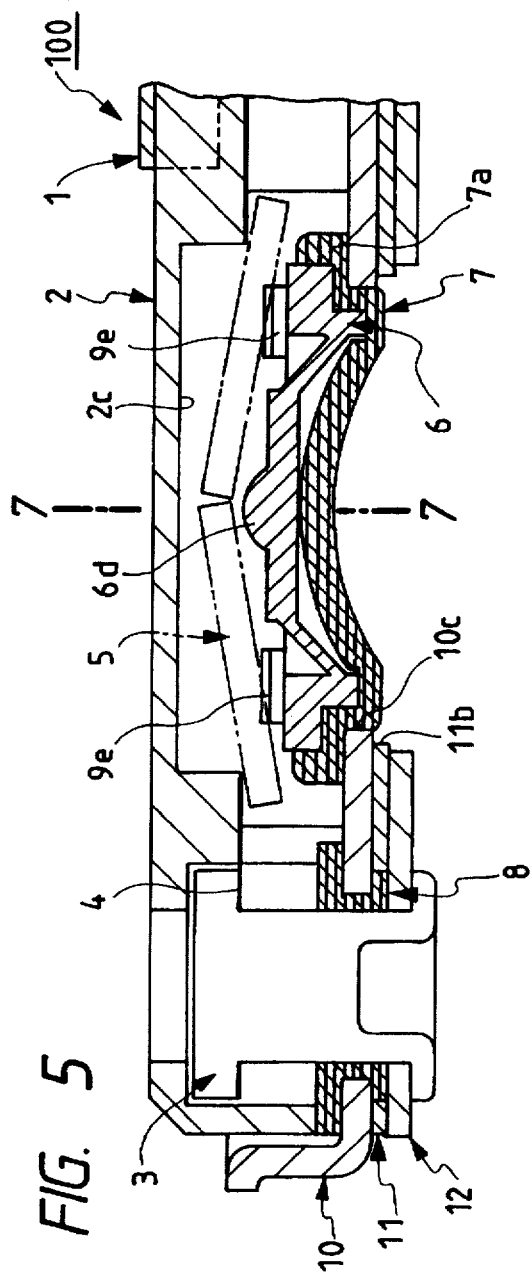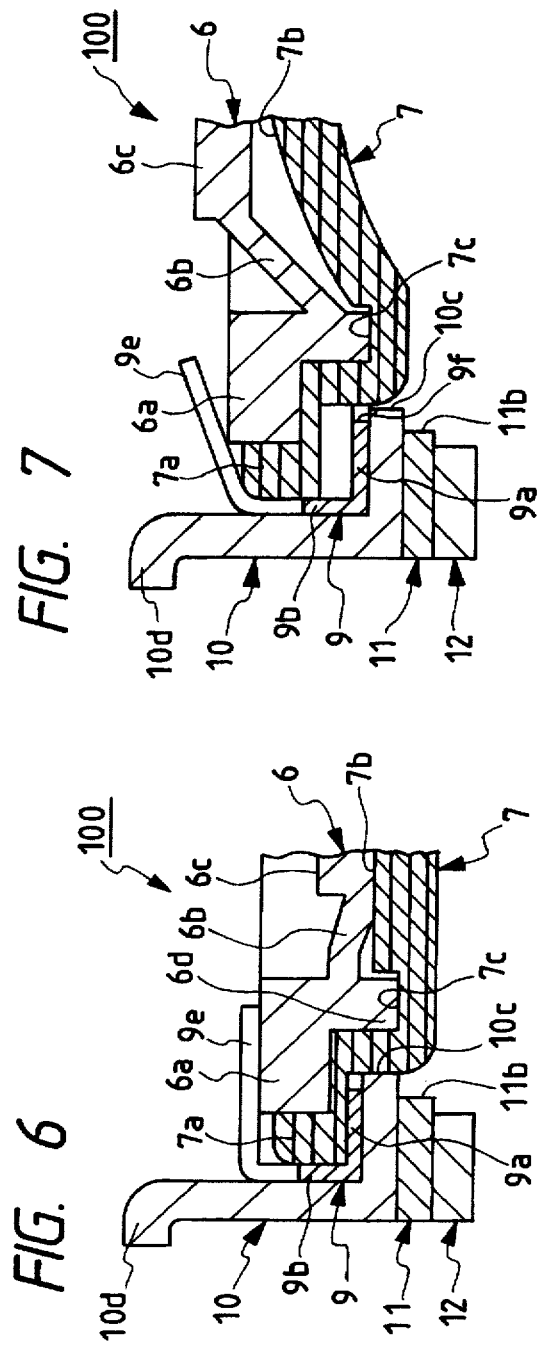

SECONDARY CELL SAFETY DEVICE INCLUDING PRESSURE RELEASE MECHANISM AND CURRENT CUTOFF MECHANISM

BACKGROUND OF THE INVENTION

1. Field of the Invention

The present invention relates to a device for ensuring the safety of a secondary cell during recharging.

2. Description of the Prior Art

If a charging potential is applied to a secondary cell after completion of a recharging process, or if the secondary cell is charged using too large of a current, then a problem arises in that gas is generated within the secondary cell. The generation of gas excessively raises the pressure and temperature within the secondary cell, causing swelling and rupture of the cell's casing, and leakage of the cell's electrolyte, thereby damaging the equipment incorporating the cell. Even if the secondary cell is not immediately ruptured, continued use of the equipment under these conditions promotes swelling of the secondary cell, possibly resulting in crack or rupture of the casing. Therefore, once an overcharge or overcurrent condition occurs, it is necessary to immediately discontinue use of the secondary cell.

In order to prevent damage to equipment incorporating secondary cells, the secondary cells have been provided with safety devices including safety valve mechanisms and current cutoff mechanisms. The safety valve mechanisms open the secondary cell in the presence of an excessive increase in the internal pressure caused by the generation of gas, thereby relieving the pressure by discharging the gas. The current cutoff mechanisms are designed to cut off the conductive path to the secondary cell in response to the excessive internal pressure, thereby checking the flow of current to the electrical circuit connected to the secondary cell.

Conventional secondary cells using a square type casing include a lid having a very complicated structure, as compared with that of a round cell, because both positive and negative poles (electrodes) of the cell are exposed from the same surface, and moreover, must incorporate a safety device.

A conventional safety valve mechanism includes a thin-walled portion formed in a metal disk which is ruptured in the event that excessive gas pressure is developed inside of the cell. This thin-walled portion was likely to be hardened if formed by a pressing process. Therefore, it is necessary to form the thin-walled portion by half etching the metal disk. However, processing by half etching is hard to perform and costly, and it is difficult to accurately control the resulting thickness of the thin-walled portion. Furthermore, thin-walled portions formed using half etching rupture at a variety of pressures.

SUMMARY OF THE INVENTION

A first object of the present invention is to provide a safety device for a secondary cell which has a simpler structure and lower cost than the above-mentioned conventional safety device, and which facilitates easier control over the operating pressure at which the safety valve releases gas from the secondary cell.

A second object of the present invention is to provide a safety device for a secondary cell which does not require a closing function for an operating member, has greater design freedom in relation to the conversion of pressure change and configuration, and is applicable to various types of cells.

In carrying out the invention and according to one aspect thereof, a safety device is provided for a secondary cell including a lid which has an opening section and can be directly or indirectly secured to a case of the cell, a pressure receiving member which covers the opening section and is flexible so that it will deflect when an internal pressure of the cell increases above a first pressure, a breaking member which has a conductive path connected at one end to an internal electrode of the cell and at the other end to an external electrode and breaks the conductive path by displacing the pressure receiving means with the change of the internal pressure of the cell, and a fastening means which fastens the pressure receiving member to the lid using pawls to thereby seal the cell interior, to keep the cell interior closed when the internal pressure is at a specific value or less, and to release gas from inside the cell through a gap produced between the pressure receiving member and the lid by bending the pawls when the internal pressure has exceeded a second pressure.

According to the above-mentioned safety device for a secondary cell, the safety device is a unit incorporating both the safety valve mechanism and the current cutoff mechanism, and is simpler in construction than the conventional safety device, and requires a narrower mounting space. Moreover, since no etching process is required for producing the safety valve, the safety device can be produced easily and at a low cost, and furthermore the operating pressure of the safety valve can easily be controlled.

According to another aspect of the invention, the pressure receiving means includes a closing member to cover the opening section, and an operating member which has higher rigidity than the closing member and receives the internal pressure of the cell through the closing member to displace outward in accordance with an increase in the internal pressure of the cell.

Accordingly, a safety device for a secondary cell in the present invention does not require the operating member to perform a closing function, has high design freedom in relation to the conversion of pressure change and configuration, and therefore is applicable to cells of various shapes.

BRIEF DESCRIPTION OF THE DRAWINGS

FIGS. 1A and 1B are a plan view and a longitudinal sectional view respectively showing in perspective a part of a safety device of a secondary cell;

FIG. 5 is an explanatory view showing the condition after operation of the safety valve mechanism of the safety device of the secondary cell according to the present invention;

FIG. 6 is a sectional view taken along line 6—6 of FIG. 1;

FIG. 7 is a sectional view taken along line 7—7 of FIG. 5; and

DESCRIPTION OF THE PREFERRED EMBODIMENT

An embodiment of the present invention will be described below with reference to the accompanying drawings.

Figure 2:
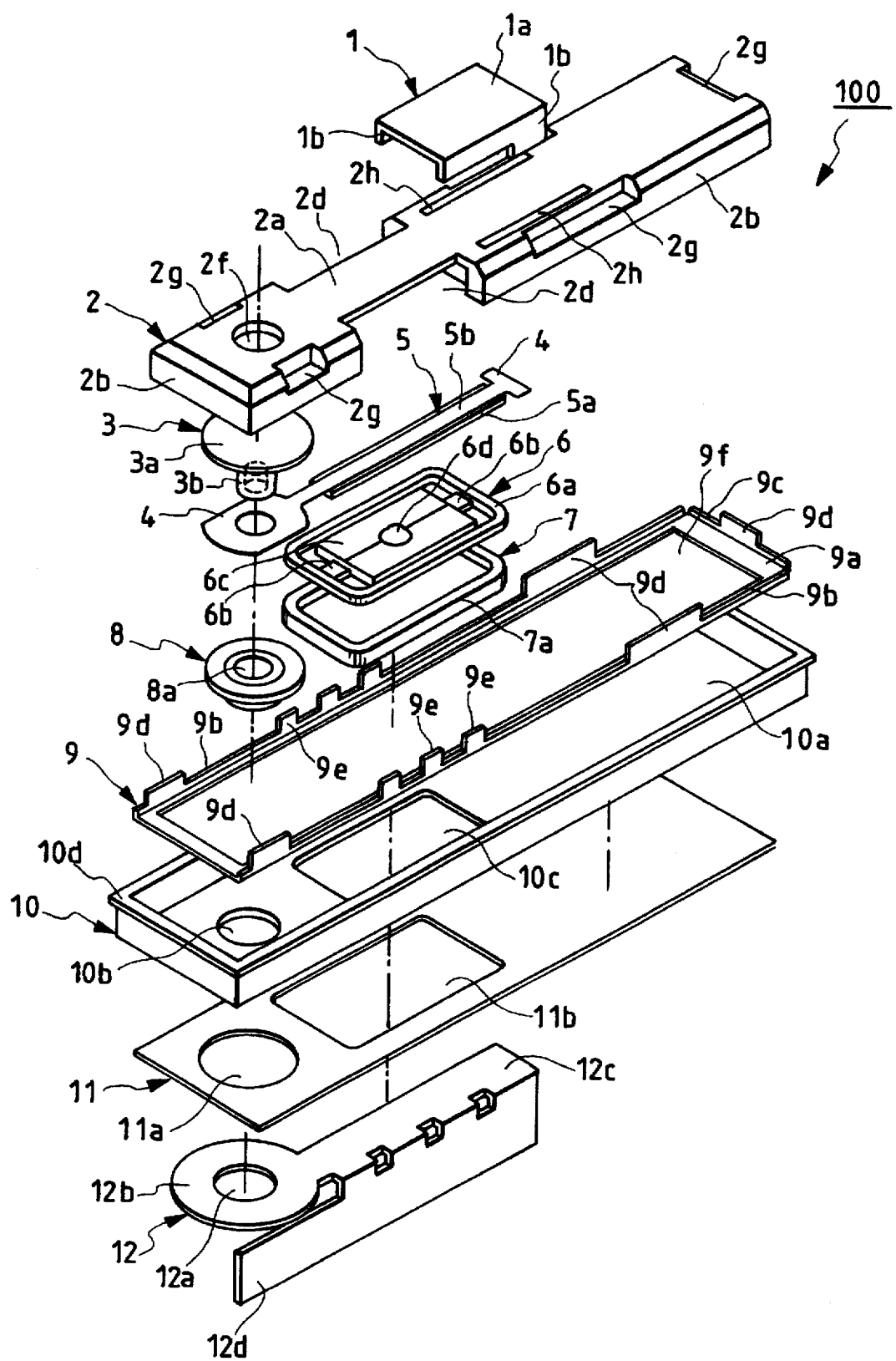
FIG. 2 is an exploded perspective view of a safety device of a secondary cell according to the present invention.
Figure 3:
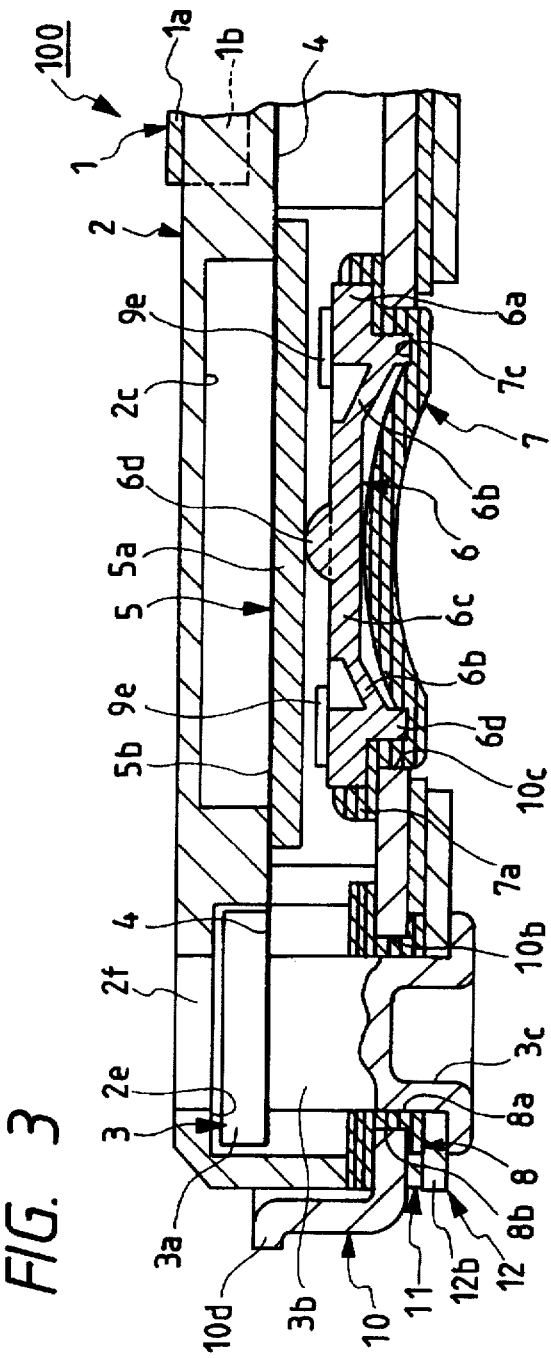
FIG. 3 is an explanatory view showing the operating condition of a current cutoff mechanism of the safety device of the secondary cell according to the present invention immediately before element rupture.
Figure 4:
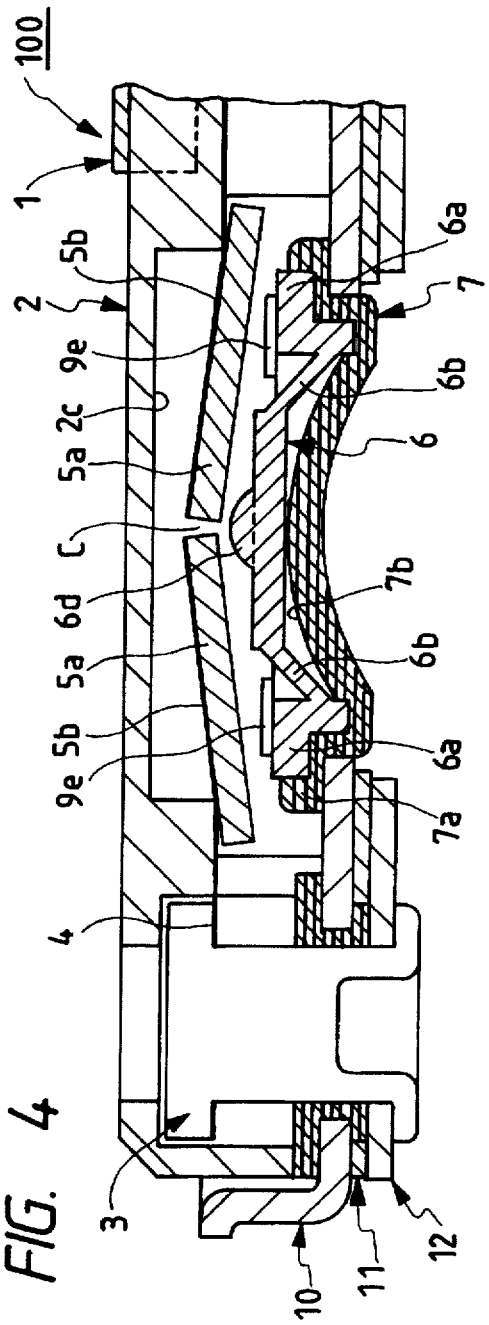
FIG. 4 is an explanatory view showing the operating condition of the current cutoff mechanism of the safety device of the secondary cell according to the present invention after the element rupture.
Figure 8:
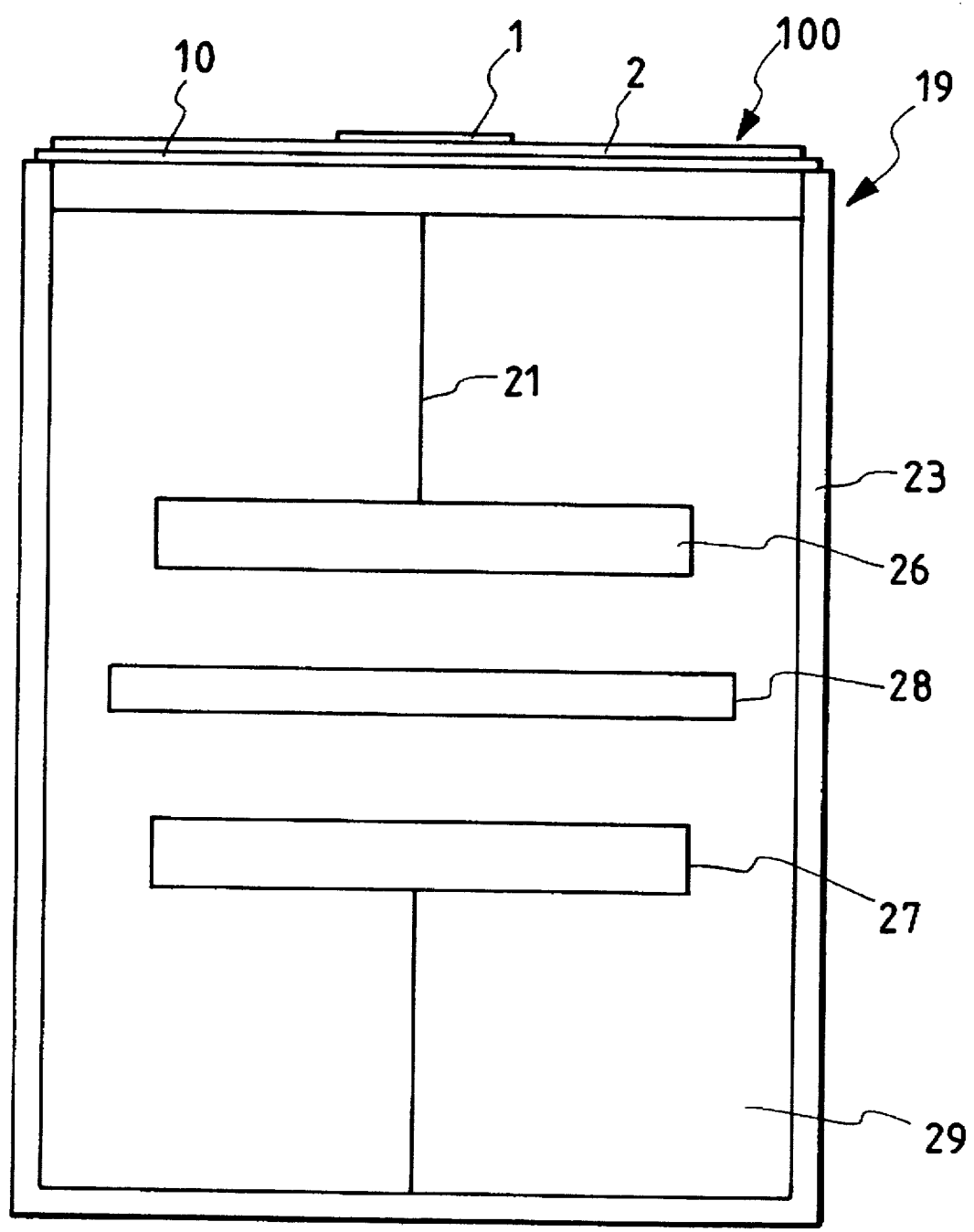
FIG. 8 is an explanatory view in schematic of the safety device of the secondary cell of the present invention using a lithium-ion secondary cell.

FIGS. 1A and 1B are a plan view and a longitudinal sectional view respectively, showing in perspective a part of a safety device of a secondary cell of the present embodiment according to the present invention; FIG. 2 is an exploded perspective view of the safety device of the secondary cell; FIG. 3 is an explanatory view showing the operating condition of a current cutoff mechanism of the safety device of the secondary cell immediately before the rupture of an element; FIG. 4 is an explanatory view showing the operating condition of the current cutoff mechanism of the safety device of the secondary cell after the rupture of the element; FIG. 5 is an explanatory view showing the safety valve mechanism of the safety device of the secondary cell after operation; FIG. 6 is a sectional view taken along line 6—6 of FIG. 1; FIG. 7 is a sectional view taken along line 7—7 of FIG. 5; and FIG. 8 is an explanatory view showing in schematic the condition of the safety device of the secondary cell applied to the lithium-ion secondary cell.

In these drawings, reference numeral 100 denotes a safety device of a secondary cell, which is provided with an external positive electrode 1, a case 2, a rivet 3, a lead 4, an element 5, an actuator 6, a diaphragm 7, a packing 8, a holding plate 9, a negative electrode case 10, an insulator 11, and a terminal 12.

The external positive electrode 1 is composed of a conductive material, e.g. a 0.3 mm thick steel sheet, the surface of which is Ni-plated, an upper plate section 1a, and side plate sections 1b, 1b formed by bending from both sides of the upper plate section 1a. The external positive electrode 1 is inserted into the case 2 and fastened by staking.

The case 2 is produced of an insulating material, e.g. PP or PPS. The case 2 has an upper surface section 2a and four side surface sections 2b, 2b, . . . and is provided with a recess section 2c formed in an opposite place of the element 5, opening sections 2d, 2d formed by cutting which will become an opening when the case 2 is mounted, a recess section 2e for the rivet and a round hole 2f formed in the back surface of the upper surface section 2a, engaging recess sections 2g, 2g, . . . into which engaging pawls of the later described holding plate 9 will be bent for fastening, and slit-like insertion sections 2h, 2h in which the leg portion of the external positive electrode 1 is inserted.

The rivet 3 is made of a conductive material, e.g. an aluminum material, and comprises a disk-shaped head portion 3a, a shank portion 3b projecting from the center of the lower surface of the head portion 3a, and a round recess 3c formed in the lower surface of the shank portion 3b. The rivet 3 is inserted through the lead 4, the packing 8, the negative electrode case 10, the insulator 11, and the terminal 12 to fasten them by forming a head on the other end by pressing.

The element 5 is provided with a rectangular base plate 5a produced of an insulating material, e.g. a ceramic material, which is breakable with the internal pressure of the cell; on the upper surface of this base plate 5a a conductive path 5b consisting of a conductive material such as an aluminum foil or other is secured by bonding. In the present example, the conductive path 5b is formed integral with the lead 4. The leads 4, 4 are led out from both ends of the conductive path 5b.

In the element 5, the leads 4, 4 are usually conducting through the conductive path 5b; however, in the event that the base plate 5a of the element 5 is broken with the internal pressure of the cell, the conductive path 5b formed on the upper surface of the base plate 5a will be exfoliated to disconnect between the leads 4, 4.

The lead 4 is produced of a conductive material, e.g. a 0.02 mm thick copper sheet, the both ends of which are held by a sensor body. The lead 4 is substantially flexible, and therefore if the base plate 5a of the element 5 is supported at both ends by the leads 4, 4, the leads 4, 4 will deflect, giving no damage to the element 5.

The lead 4 is bonded at the central part on the upper surface of the base plate 5a, forming a conductive path 5b. The lead 4 portion connected integrally with one end of the conductive path 5b serves as one lead 4, at the center of which is formed a round hole 4a, while a lead 4 portion integrally connected with the other end of the conductive path 5b serves as another lead 4.

This type of element 5 is longitudinally mounted opposite the recess section 2c of the case 2; therefore there is provided a space above the element 5, so that the element 5 will extend into the recess section 2c when broken. The recess section 2c is large enough to allow breaking of the element 5 therein and further moving upward after breaking.

The actuator 6 is produced of an insulating material, e.g. PP or PE. The actuator 6 comprises an approximately square frame-like frame portion 6a, a movable plate portion 6c connected through a couple of connecting pieces 6b, 6b in the frame portion 6a, a projection 6d provided at the center of the upper surface of the movable plate portion 6c, and a projecting portion 6e provided on the inner periphery of the lower surface of the frame portion 6a.

The diaphragm 7 is produced of an insulating material, e.g. EPDM. The diaphragm 7 is generally square in shape; on the outer peripheral edge is formed a ridge 7a; at the center is formed a recess portion 7b; and further around the bottom surface of the recess portion 7b is provided a groove 7c in which the projecting portion 6e of the actuator 6 fits.

The packing 8 is produced of an insulating material, e.g. EPD, and is formed in a shape of ring having a through hole 8a. In the outer peripheral surface is formed an annular groove 8b, in which the peripheral edge portion of the through hole of the later described negative electrode case 10 fits.

The holding plate 9 is produced of a conductive material, e.g. a 0.1 mm thick stainless material, and is secured to the negative electrode case 10 by welding through the entire periphery. This holding plate 9 is composed of a rectangular bottom plate portion 9a, a rectangular opening 9f formed within the periphery of the bottom plate portion 9a, bent piece portions 9b, 9b, and 9c formed by bending upward from a long-side portion and one short-side portion located oppositely to the bottom plate portion 9a, a locking pawl 9d further extended upward from the upper end of the bent piece portions 9b, 9b, and 9c and staked in the engaging recesses 2g, 2g, . . . of the case 2, and locking pawls 9e, 9e, . . . extended further upward from the upper end of the bent piece portions 9b, 9b and securing the actuator 6 to the opening section 10c of the later described negative electrode case 10 through the diaphragm 7 so that the opening section 10c will be closed hermetically.

The negative electrode case 10 is produced of a conductive material, e.g. a 0.4 mm thick stainless material. The negative electrode case 10 is formed in a shape of a bottomed square box which is open at the upper part. In the bottom plate portion 10a is formed a through hole 10b near its one end, and a rectangular opening 10c is formed near its center. Furthermore, the upper end portion of the side plate of the negative electrode case 10 protrudes outward to serve as a flange section 10d. The negative electrode case 10 is fitted in the upper opening of a cell case 23 of the secondary cell indicated by an alternate long and short dash line in FIG. 1B and welded over the entire periphery to hermetically close the interior of the cell.

The insulator 11 is produced of an insulating material, e.g. PP, and is formed in a rectangular plate shape. A through hole 11a is provided by punching in a position corresponding to the through hole 10b of the negative electrode case 10 near one end thereof. Also, a rectangular opening section 11b is formed in a position corresponding to the opening section 10c of the negative electrode case 10 near the center thereof. These through hole 11a and opening section 11b are formed larger than the through hole 10b and the opening section 10c of the negative electrode case 10.

The safety device 100 of this secondary cell has a terminal 12 connected to the element 5 by a rivet 3, and secured to the back side of the insulator 11 by the rivet 3 as shown in FIG. 1B. The terminal 12 is produced of a conductive material, e.g. 0.3 mm thick aluminum material, and comprises a ring plate portion 12b having a round hole 12a into which the lower end portion of the rivet 3 is inserted, a holding plate portion 12c extending from the ring plate section 12b and formed by bending longitudinally downward, and a terminal portion 12d.

The external positive electrode 1 and the terminal 12 are conducted through the element 5 and the lead 4 as described above; therefore the current flows into the conductive path 5b of the element 5 through the other lead 4 from the external positive electrode 1, and furthermore can flow from the other lead 4 to the rivet 3 and the terminal 12. The reverse flow of the current is also possible.

The safety device 100 of the second cell is incorporated as a part of the secondary cell 19, e.g. a lithium-ion secondary cell and a nickel-hydrogen secondary cell.

FIG. 8 is a schematic view showing a lithium-ion secondary cell used as the secondary cell 19, in which reference numeral 23 denotes a square, hollow, bottomed cell case open at the upper end portion, serving as an external negative electrode. The safety device 100 is secured to the cell case 23 by welding the safety device 100 to the entire periphery of the upper opening section of the cell case 23, while maintaining insulation performance between the cell case 23 and the safety device 100 and tightly closing the secondary cell interior. The safety device 100 may be indirectly fixed to the upper opening section of the cell case 23 by inserting a gasket or the like therebetween.

In the cell case 23 are incorporated a positive electrode 26 as an internal electrode consisting of lithium-oxide cobalt, a negative electrode 27 consisting of carbon, and a separator 28 for preventing the occurrence of a short circuit of the positive and negative electrodes. The external positive electrode 1 of the secondary cell safety device 100 is connected to the positive electrode 26 by means of a wiring member 21. Also the negative electrode 27 is mounted oppositely to the positive electrode 26 across the separator 28, and connected to the cell case 23. Furthermore, the interior of the cell case 23 is filled with the electrolyte not shown.

Next, operation of the safety device used as the aforesaid embodiment with the lithium-ion secondary cell will be explained.

In the safety device 100 of the secondary cell, the current flows, during a charge, from the external positive electrode 1 to the positive electrode 26 through the first lead 4, the conductive path 5b of the element 5, the second lead 4, the rivet 3, the terminal 12, and the wiring member 21 in order of mention.

At this time, if the current keeps on flowing even after the completion of charge to cause overcharge, or if a greater current than a specified current is allowed during the charge, there will occur a trouble in the secondary cell, resulting in increased secondary cell pressure and temperature.

If the secondary cell pressure rises over the value shown in FIGS. 1A and 1B and FIG. 6, the pressure is transmitted as a cell internal pressure to the secondary cell safety device 100. Then, the cell internal pressure deflects the diaphragm 7 inward (upward in the drawing) until the inner surface of the diaphragm 7 contacts the lower surface of the movable plate portion 6c of the actuator 6, so that the movable plate portion 6c supported by link portions 6b, 6b moves upward and the projecting portion 6d of the actuator 6 comes into contact nearly with the center of the lower surface of the base plate 5a of the element 5 as shown in FIG. 3.

When the internal pressure of the cell has further increased to a specific pressure, the element 5 receives the pressure via the projecting portion 6d of the actuator 6, further deflecting, as shown in FIG. 4, to force the element 5 into the recess 2c of the case 2, in which the element will be broken. In this case, the base plate 5a, being not directly fixed on the lower surface of the case 2, will not increase in rigidity more than needed, and accordingly the breaking force applied to the base plate 5a of the element 5 can easily be controlled.

In the event of discontinuity between the leads 4, 4 caused by the spalling or breakage resulting from a crack C of the base plate 5a, the safety device 100 of the secondary cell cuts off the current flowing between the external positive electrode 1 and the internal positive electrode 26 of the generating section, a further charge is stopped and the lithium-ion secondary cell is made inoperative as a storage battery.

In FIG. 4 the interior of the secondary cell is held in a closed condition.

The operation of the current cutoff mechanism in the safety device 100 of the secondary cell, i.e. a mechanism for cutting off the current by a pressure, has heretofore been explained. Subsequently the operation of the safety valve mechanism which operates will hereinafter be explained.

If the internal pressure of the cell rises over the condition in FIG. 4, the internal pressure of the cell is exerted to the diaphragm 7, which therefore is deflected upward. When the amount of upward deflection of the diaphragm 7 and the amount of deformation of the actuator 6 reach their limits, i.e. the pressure exerted to the diaphragm 7 by the internal pressure of the cell, increase over a staking force of the locking pawls 9e, 9e, . . . of the holding plate 9 which hermetically holds the diaphragm 7 (and the actuator 6), the locking pawls 9e, 9e, . . . are forced to be bent back upward and the actuator 6 and the diaphragm 7 rise from the opening section 10c of the negative electrode case 10. And as shown in FIGS. 5 to 7, there is produced a gap between the diaphragm 7 and the peripheral edge of the opening section 10c of the negative electrode case 10. Through this gap the gas flows out of the cell into the negative electrode case 10, then being discharged out of the cell through the opening sections 2d, 2d of the case 2.

As heretofore described, with the rise of the internal pressure of the secondary cell, the diaphragm 7 as the safety valve opens to let the gas out of the secondary cell.

In the embodiment of the above-described constitution, the safety device comprises a lid (2, 10) having an opening section 2d and 10c and hermetically fixed directly or indirectly to the cell case 23; a pressure receiving means (6, 7) which covers the opening section 10c and is flexible so as to deflect when applied with the internal pressure of the cell; a shielding means (5) which has a conductive path 5b connected at one end to an internal electrode of the cell (26, or 27) and at the other end to the external electrode 1, and shields the conductive path 5b with the displacement of the pressure receiving means (6, 7) caused by the change of the internal pressure of the cell; and locking pawls 9e, 9e, . . . which close the cell interior by staking the pressure receiving means (6, 7) to the lid (10), and keep the closed state of the cell interior when the internal pressure has decreased to the specific value and under and unfasten the staked part to produce a gap between the pressure receiving means (6, 7) and the lid (10), thus releasing the gas out when the internal pressure has increased over the specific value. That is, the safety device is a unit including a safety valve mechanism and a current cutoff mechanism in one body, and is a simpler construction which requires a narrow space, and furthermore as no etching process is adopted to process the safety valve, component parts can be produced with ease and at a low cost, and the operating pressure of the safety valve can be controlled with ease.

In the above-described embodiment, since the pressure receiving means (6, 7) comprises a closing member (7) which covers the opening section 10c, and an operating member (6) which has higher rigidity than the closing member (7) and receives the internal pressure of the cell through the closing member (7) to displace outward in accordance with the internal pressure, the operating member (6) requires no closing function. Therefore, the operating member (6) has the high design freedom relative to the change of pressure displacement and configuration, so that it will be applicable to various shapes of cells.

What is claimed is:

1. A safety device for a secondary cell, the secondary cell including a cell case having a first opening and containing an internal electrode, the safety device comprising:
   a lid positioned over the first opening of the cell case and defining a second opening;
   an external electrode mounted on the lid; a pressure receiving assembly covering the second opening;
   a breakable member positioned adjacent to the pressure receiving member and having a conductive path formed thereon, the conductive path including a first end connected to the internal electrode of the secondary cell and a second end connected to an external electrode; and
   a fastening member mounted on the lid and having pawls extending over the pressure receiving member, whereby the pressure receiving member is fastened over the second opening to seal an interior of the cell case;
   wherein when an internal pressure of the cell case interior increases to a first pressure, the pressure receiving member is deformed by the internal pressure against the breakable member, whereby the breakable member is broken and current between the external electrode and the internal electrode along the conductive path is cut off; and
   wherein when the internal pressure of the cell case increases from the first pressure to a second pressure, the pressure receiving assembly pushes against the pawls of the fastening member, whereby the pawls are bent to allow movement of the pressure receiving assembly relative to the lid, thereby forming a gap between the pressure receiving assembly and the lid which allows gas to escape from the cell case interior.

2. A safety device for a secondary cell according to claim 1, wherein said pressure receiving assembly comprises:
   a diaphragm mounted on the case and covering the second opening; and
   a rigid actuator mounted between the diaphragm and the breakable member;
   wherein deformation of the diaphragm in response to the internal pressure pushes the rigid actuator against the breakable member.

3. A secondary cell comprising:
   a cell case having a first opening and containing an internal electrode; and
   a safety device mounted on the cell case, the safety device including:
   a lid positioned over the first opening of the cell case and defining a second opening;
   an external electrode mounted on the lid;
   a diaphragm mounted on the lid and covering the second opening;
   an actuator mounted on the diaphragm;
   an elongated member supported on the lid and positioned adjacent to the actuator such that the actuator is positioned between the elongated member and the diaphragm, the elongated member having a conductive path formed thereon, the conductive path including a first end connected to the internal electrode of the secondary cell and a second end connected to an external electrode;
   wherein when an internal pressure of the cell case interior increases to a first pressure, the diaphragm is deformed toward the elongated member by the internal pressure, thereby biasing the actuator against the elongated member and causing the elongated member to deform, wherein deformation of the elongated member breaks the conductive path such that current between the external electrode and the internal electrode along the conductive path is cut off.

4. A secondary cell according to claim 3, wherein the elongated member is ceramic, and the conductive path comprises metal foil.

5. A secondary cell comprising:
   a cell case having a first opening and containing an internal electrode; and
   a safety device mounted on the cell case, the safety device including:
   a lid positioned over the first opening of the cell case and defining a second opening;
   an external electrode mounted on the lid;
   a pressure receiving member mounted on the lid and covering the second opening; and
   a fastening member mounted on the lid and including a plurality of pawls extending over the pressure receiving member, whereby the pressure receiving member is fastened over the second opening to seal an interior of the cell case;
   wherein when the internal pressure of the cell case increases to a first pressure, the pressure receiving member pushes against the pawls of the fastening member, whereby the pawls are bent to allow movement of the pressure receiving assembly relative to the lid, thereby forming a gap between the pressure receiving assembly and the lid which allows gas to escape from the cell case interior.

6. A secondary cell according to claim 5, wherein the pressure receiving member comprises a diaphragm.

* * * * *